United States Patent
Jonsson

(10) Patent No.: US 7,366,230 B2
(45) Date of Patent: Apr. 29, 2008

(54) POWER CONTROL IN MOBILE RADIO COMMUNICATIONS SYSTEMS

(75) Inventor: Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 609 days.

(21) Appl. No.: 10/499,071

(22) PCT Filed: Dec. 18, 2002

(86) PCT No.: PCT/EP02/14458

§ 371 (c)(1),
(2), (4) Date: Jun. 15, 2004

(87) PCT Pub. No.: WO03/055098

PCT Pub. Date: Jul. 3, 2003

(65) Prior Publication Data

US 2005/0143112 A1    Jun. 30, 2005

Related U.S. Application Data

(60) Provisional application No. 60/346,745, filed on Jan. 7, 2002.

(30) Foreign Application Priority Data

Dec. 21, 2001  (SE) .................................. 0104426

(51) Int. Cl.
*H04B 1/38*   (2006.01)
*H04B 1/66*   (2006.01)
*H04N 7/12*   (2006.01)
*H04N 11/02*  (2006.01)

(52) U.S. Cl. ................ 375/219; 375/240.26; 375/284; 375/285; 375/296

(58) Field of Classification Search ........ 375/219–221, 375/240.26–240.27, 254, 284, 285, 296, 375/297, 345, 346; 370/318, 333, 332; 455/500, 455/501, 63.1, 67.11, 88, 114.2, 115.1, 114.3, 455/127.1

See application file for complete search history.

(56) References Cited

U.S. PATENT DOCUMENTS 6,373,878 B1 *  4/2002  Palenius et al. ............ 375/136

(Continued)

FOREIGN PATENT DOCUMENTS

EP    0776 105    5/1997

(Continued)

OTHER PUBLICATIONS

3GPP TS 25.214 v5.9.0 (Jun. 2004) 3rd Generation Partnership Project; Technical Specification Group Radio Access Network; Physical layer procedures (FDD) (Release 5).

(Continued)

*Primary Examiner*—David C. Payne
*Assistant Examiner*—Linda Wong
(74) *Attorney, Agent, or Firm*—Michael Cameron

(57) ABSTRACT

A power control unit (500) for a power control system in a mobile communication system, the power control unit (500) comprising an inner power control loop element (503, 507), which generates a transmit power control command (504), and an outer power control loop element (516) connected to the inner power control loop element (503, 507), the outer power control loop element (516) being configured for providing a target value (506) to the inner power control loop element (503, 507). The outer power control loop element (516) comprises a soft information estimator (509) connected to at least one outer loop regulator (501, 502), wherein the soft information estimator (509) is configured to provide a soft information estimate (510) to the at least one outer loop regulator (503).

15 Claims, 6 Drawing Sheets

U.S. PATENT DOCUMENTS 6,633,552 B1 * 10/2003 Ling et al. .................. 370/318
6,799,045 B1 * 9/2004 Brouwer ..................... 455/453
6,810,020 B2 * 10/2004 Cho et al. ................... 370/253

FOREIGN PATENT DOCUMENTS

EP 0853 393 7/1998
WO WO 01/11800 2/2001

OTHER PUBLICATIONS

Harri Holma and Antti Toskala, WCDMA for UMTS Radio Access for Third Generation Mobile Communications.

* cited by examiner

POWER CONTROL IN MOBILE RADIO COMMUNICATIONS SYSTEMS

This patent application claims the benefit of priority from U.S. Provisional Patent Application Ser. No. 60/346,745 filed on Jan. 7, 2002. This application incorporates by reference the entire disclosure of U.S. Provisional Patent Application Ser. No. 60/346,745.

TECHNICAL FIELD OF THE INVENTION

This invention relates generally to a power control system and an associated method for a mobile radio communications system and more specifically to a power control unit for the power control system. The power control unit comprises an inner power control loop element, which generates a transmit power control command, and an outer power control loop element connected to the inner power control loop element. The outer power control loop element is configured for providing a target value to the inner power control loop element.

DESCRIPTION OF RELATED ART

In mobile radio communication systems, power control is employed to compensate for variations in a wireless propagation channel.

Power control aims at compensating for the variations in the wireless propagation channel to maintain a high transmission quality in the mobile radio communication system. A transmitted signal is sent from a transmitter over the wireless propagation channel to a receiver. The signal is affected and corrupted by the channel. For example, the power of the signal is decreased with increasing propagation distance and the signal power is varying due to fading in the wireless propagation channel. A power control system regulates the transmitted signal power to a minimum power level that gives an acceptable performance at the receiver. It is important that this level is the lowest needed in order to have a low co-channel interference, which gives a better capacity, which for example may be measured as the number of possible simultaneous users per unit area in the mobile communication system. Also, low transmitted power results in low power consumption, which is of importance especially to handheld and portable mobile units, due to limited battery capacity. However, some margin to the minimum level is required due to the fading dips that occur in the wireless propagation channel. Power control could be used in one of, or both, uplink (the propagation direction from a mobile unit to a base station) and downlink (the propagation direction from the base station to the mobile unit). In the uplink the mobile unit is the transmitter and in the downlink the base station is the transmitter.

Multipath fading is due to reflections of a propagating radio signal sent from a transmitter to a receiver. It causes a received signal power level to vary very rapidly with deep dips now and then. To compensate for this effect, a closed power control loop is used. The received power is measured at regular intervals and after each measurement control commands are sent to the transmitter on the other end, with instructions how to adjust the transmitted power. The transmitted power may be changed in steps of, for example, 1 dB.

In, for example a 3GPP (Third Generation Partnership Project) solution for a WCDMA (Wideband Code Division Multiple Access) system, the closed power control loop comprises an inner power control loop and an outer power control loop. In the 3GPP specification number 25.214, "Physical layer procedures (FDD)", power control for a WCDMA system is described. This documentation is hereby incorporated by reference. The purpose of the outer power control loop is to set and continuously adjust a target value for a quality measure for the inner power control loop to aim at. The target value is based on an estimated received quality measure. A flowchart for a general prior art outer power control loop method is shown in FIG. 1.

The received quality is compared to the required quality 101. If the received quality is better than the required quality, the target value is decreased 102 and if the received quality is worse than the required quality, the target value is increased 103.

In FIG. 2 an illustration of an uplink scenario in a prior art mobile communication system 200 is shown. The system comprises a radio network controller (RNC) 201, which comprises an outer power control loop unit 202. The system further comprises a base station 203, and a mobile unit 204. The RNC 201 processes received signal information 205 from the base station 203, and the quality measure for the received signal is input to the outer power control loop unit 202. The outer power control loop unit 202 then sets the target value 206, which is sent to the base station 203 for processing in an inner power control loop (not shown) into a power control loop command 207, which is sent to the mobile unit 204. In a corresponding downlink scenario, the power control would be present in the mobile unit instead, thereby controlling the transmitted power from the base station.

FIG. 3 shows a schematic block diagram for a prior art power control unit 300 in either uplink or downlink in a WCDMA mobile communication system based on the 3GPP specification. The power control unit 300 is usually located in a receiver in the mobile communication system. The power control unit comprises a first regulator 301, which is a part of an outer power control loop element 312, and a second regulator 302, which is a part of an inner power control loop. The regulators are arranged in cascade. The inner power control loop sends a transmit power control command 303 (TPC) to a transmitter (not shown) to inform how it should adjust its transmitted power. The power is adjusted in a predetermined manner. The adjustment is dependent on the estimated quality measure 304 compared to the target value 305. If the estimated quality measure 304 is below the target value 305, a TPC command 303 is sent to the transmitter to increase its power, and if the estimated quality measure 304 is above the target value 305, a TPC command 303 is sent to the transmitter to decrease its power. The estimated quality measure 304 may be a signal-to-interference (SIR) value, which a SIR estimator 306 estimates based on pilot bits 307 sent from the transmitter to the receiver. Since the pilot bits 307 are known at the receiver and have experienced the same propagation conditions on the wireless propagation channel as the information signal, an estimate on the quality measure 304 for the information signal may be found. The target value 305 is estimated by the first regulator 301 based on a block error rate (BLER) target 308, which is set by the higher layers in the mobile communication system, and an estimated BLER 309, which has been estimated by a BLER estimator 310. The BLER estimator 310 bases its estimation on CRC (Cyclic Redundancy Check) error bits on each block of data bits. The receiver processes the CRC error bits and forms a CRC error flag 311. If this flag is in a state of "not set", the block of data bits is assumed to be possible to recover correctly in the receiver. Otherwise, if the flag is "set" the whole block of data bits is considered in error. In WCDMA both the inner power control loop and the outer power control loop is supported in both uplink and downlink. The inner power control loop is a fast control loop, with a 1.5 kHz frequency, which is able to compensate for fast fading effects in the wireless propagation channel.

The SIR estimator 306 is estimating SIR for every slot of data, which is for example every 10/15 ms for WCDMA. It is the BLER estimator 310, which is the time limiting factor of the power control unit 300. It estimates the BLER by checking the CRC for every block of data bits and this gives a very long delay in the system, since the second regulator 302 cannot start its operation until it is given the target value 305. For example, for a block length of 20 ms and if 1000 blocks are needed to estimate the BLER, which would be reasonable for a BLER target 308 of 0.01, this computation requires 20 seconds in time, which results in a very slow system. This is highly undesirable since the conditions of the mobile propagation channel are constantly changing and it is important that the power control is working rapidly to be valid.

Thus the block diagram in FIG. 3 may not be sufficient or lack in performance for systems, like WCDMA, that also employ high quality services, which have even higher demand for correct and fast power control than for example speech services. Instead of only relying upon the CRC, the quality measure may be supplemented with an estimation of e.g. soft information. Such information may be an estimated uncoded bit error rate (ucBER) before a channel decoder in a receiver, also called raw BER. Other examples of soft information are bit error rates or block error rates after an intermediate decoding iteration in the receiver, or received SIR. Using soft information may give a faster indication on the changes in the wireless propagation channel. To estimate soft information is briefly indicated in chapter 9 of "WCDMA for UMTS, Radio Access for Third Generation Mobile Communications", edited by Harri Holma and Antti Toskala, and printed by John Wiley and Sons, 2000.

SUMMARY OF THE INVENTION

It is a purpose of the present invention to provide a method of determining a target value for a control loop of a power control system which provides a statistically reliable target value within a short time.

The purpose above is achieved by method of determining a target value for a control loop of power control system, a power control system, an arrangement for determining such a target value, a power control unit comprising such an arrangement, a transceiver comprising such a power control unit, and a mobile communication system, which are shown to comprise the features in the following independent claims. The preferred embodiments of the power control unit, method and system are apparent from the dependent claims.

To accumulate reliable statistics for a block error rate (BLER) is recognized to be time consuming and is thus a limiting factor in a power control system. The present invention realizes that a faster tuning for the power control system instead could be achieved if the sent power is adjusted to, for example, a given target uncoded bit error rate (ucBER), which is a measure of soft information. The target uncoded bit error rate is in turn adjusted depending on the BLER. Preferably, the outer power control loop can be implemented with low complexity when using soft information in the form of ucBER. The ucBER is preferably estimated from received pilot bits instead of from data bits carrying the real information. This estimation has the advantage that the pilot bits are known bits, thus making them suitable for estimating an impact on the bits by a wireless propagation channel. Usually there is a different number of data bits compared to the number of pilot bits in a slot. According to the invention, it has been realised that the statistical reliability of the calculated bit error rate, and thus the resulting target value for the control loop, is improved when an underflow of the estimated symbols at the receiver is compensated for. Such an underflow may be caused by transmission errors and the limited bit resolution of the estimated symbols at the receiver. This underflow is overcome by the present invention by underflow compensation.

The pilot bits are encoded as symbols each presenting a number of bits. At the receiver, an estimate of the transmitted pilot symbols is determined from the received pilot symbols and from an estimate of the transmission channel. If the true transmission channel was known, the transmitted pilot symbols could completely be recovered at the receiver. In reality, however, bit errors occur. An accumulated bit error is determined by comparing the estimated transmitted symbols with the known reference pilot symbols and by counting the number of bits which are incorrectly recovered from the estimated transmitted pilot symbols. Since the estimated transmitted symbols are represented with a finite bit resolution, e.g. 4 bits, an underflow situation may occur where the estimated transmitted symbol is determined to be zero, thereby not carrying sufficient information about the received bits. According to the invention, such an underflow is compensated for in the calculation of the accumulated bit error.

It is an advantage of the present invention that it provides a low complexity and realisable power control system, in which an outer power control loop is based on soft information estimation to set a correct target value, i.e. a SIR reference value, for an inner power control loop, which will make the power control system less time consuming than the prior art methods.

It shall be emphasized that the terms "comprises" and "comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

A more complete understanding of the present invention may be acquired by reference to the following detailed description when taken in conjunction with the accompanying drawings wherein.

DETAILED DESCRIPTION OF PREFERRED EMBODIMENTS OF THE INVENTION

The main purpose of power control in a mobile communication system is to control the sent power, in such a way that a block error rate (BLER) at a receiver is held constant at a given target value. Since it takes a long time to accumulate reliable statistics for the BLER, a faster tuning could be achieved if the sent power is adjusted to a given target uncoded bit error rate (ucBER), which is a measure of soft information. The target uncoded bit error rate is in turn adjusted depending on the block error rate. According to the embodiments of the present invention the outer power control loop can be implemented with low complexity when using soft information in the form of ucBER.

Figure 1:
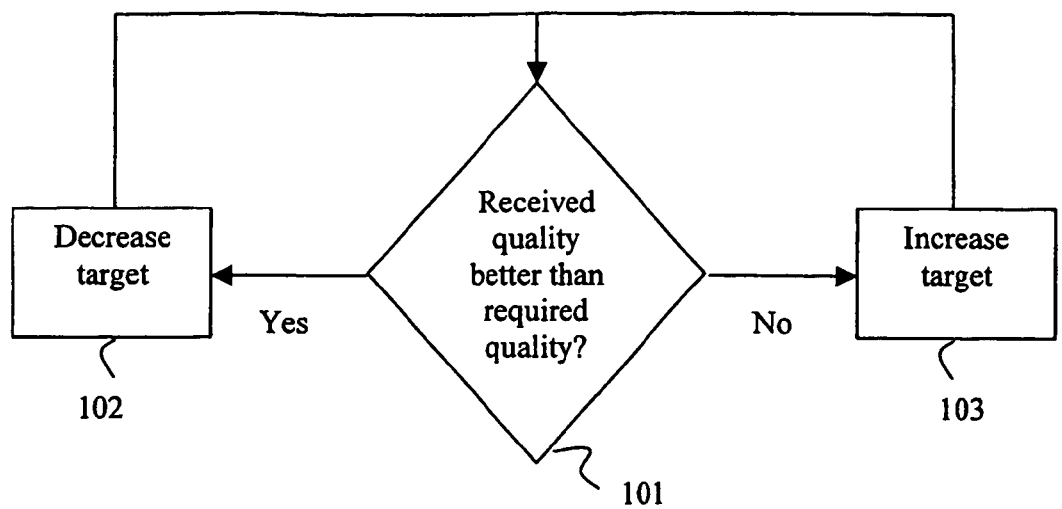
FIG. 1 illustrates a general prior art outer power control loop method.
Figure 2:
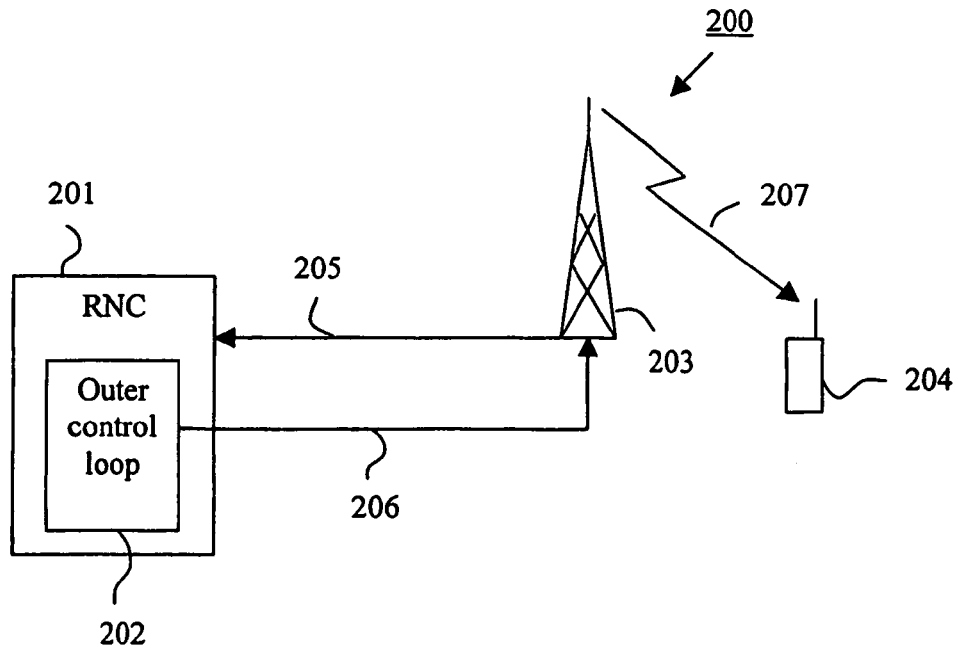
FIG. 2 illustrates an example of a WCDMA system with uplink power control.
Figure 3:
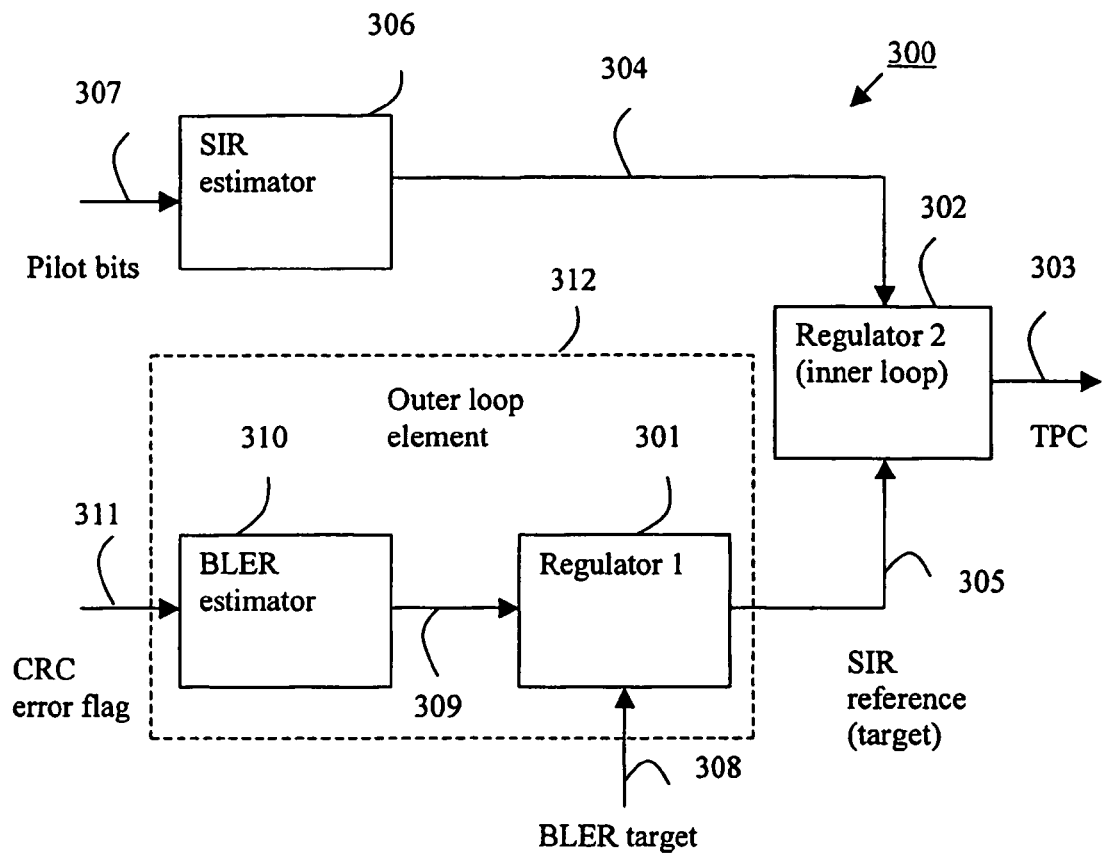
FIG. 3 is an illustration of a prior art power control unit based on cyclic redundancy check (CRC) only.
Figure 4:
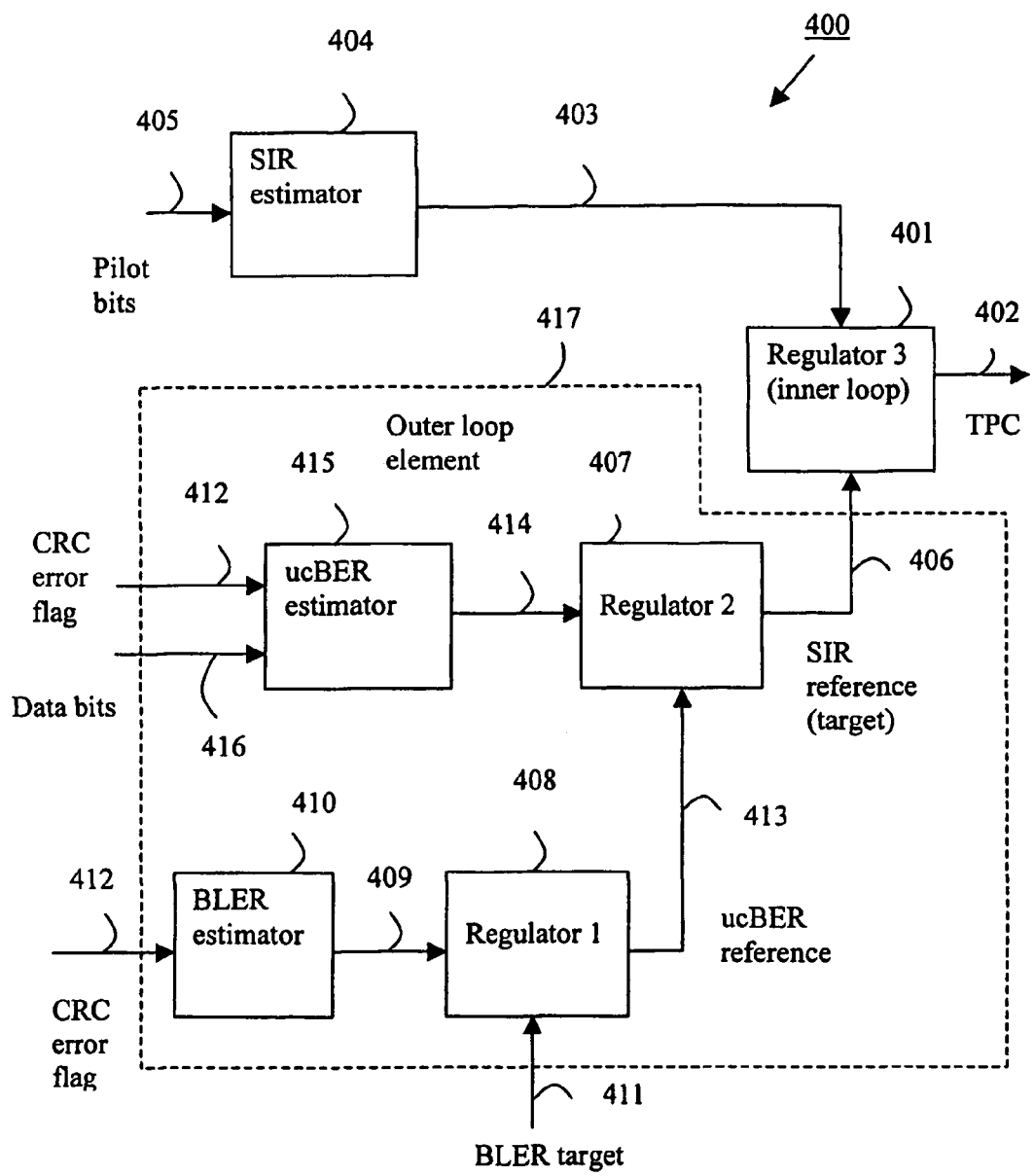
FIG. 4 is an illustration of a cascaded power control unit based on soft information and CRC according to a first embodiment of the present invention.

In FIG. 4 a schematic block diagram is shown for a power control unit 400 for either uplink or downlink in a mobile communication system, where the power control unit 400 is using soft information according to a first embodiment of the present invention. The system comprises three regulators in cascade and each of the regulators may for example be a PI-regulator, although other well-known regulators may be used, such as PID regulators. Also different types of regulators may be used for each regulator in the power control unit 400. The third regulator 401 determines the TPC command 402, which is comprised in the inner power control loop. The inner power control loop sends the TPC command 402 to a transmitter (not shown) to inform how it should adjust its transmitted power level. The power level is adjusted in a predetermined manner. The adjustment is dependent on an estimated quality measure 403 compared to the target value 406. If the estimated quality measure 403 is below the target value 406, a TPC command 402 is sent to the transmitter to increase its power level, and if the estimated quality measure 403 is above the target value 406, a TPC command 402 is sent to the transmitter to decrease its power. The third regulator 401 regulates on the estimated quality measure 403, which may be a SIR estimate, estimated by the SIR estimator 404 on received bits, e.g. pilot bits 405. Preferably, this is performed every slot, which is 10/15 ms for WCDMA. The estimated quality measure 403 is regulated to meet the SIR reference value 406, the target value, which is estimated by a second regulator 407. The second regulator 407 and a first regulator 408 are arranged in cascade and are comprised in the outer power control loop element 417. The first regulator 408 has the same function as the first regulator 301 in the prior art power control unit 300 of FIG. 3. It regulates on the estimated BLER value 409 from a BLER estimator 410 to meet the BLER target value 411, set by higher layers of the system. The BLER estimator 410 uses a CRC error flag 412 to determine errors in received blocks of data. The BLER estimation is based on a CRC error flag 412 for example by filtering the CRC error flag 412 with appropriate filter constants. Alternatively, the BLER estimator 410 uses a moving average to get the estimated BLER value 409 from the CRC error flag 412.

The result of the regulation in the first regulator 408 is an uncoded BER (ucBER) reference value 413 for the second regulator 407 to aim at. This second regulator 407 regulates an estimated ucBER 414 to meet the ucBER reference value 413 and thereby estimate the SIR reference value 406, or the target value for the inner power control loop 401. An ucBER estimator 415 forms the ucBER estimate 414, the soft information, based on received data bits 416 and the CRC error flag 412. If the CRC error flag 412 is in a state of being "set", all the data bits are assumed to be incorrect and retransmission is needed. However, if the flag 412 is "not set" this implies that raw data bits will be possible to recover correctly in the receiver. Then the ucBER estimator performs all the actions performed by the transmitter on the information signal, i.e. the correctly recovered data bits are for example coded and interleaved to reconstruct the correct raw data bits. The correct raw data bits are then compared to the received data bits 416 to provide the ucBER estimate 414. The ucBER estimator 415 performs its operation preferably on every block, which is for WCDMA every 30 slots. This means that it needs 30×10/15 ms=20 ms in operational time. By adding the ucBER estimator 415 and the second regulator 407 in the outer power control loop element 417, a quality measure for the wireless propagation channel is thus provided earlier than errors are visible by the CRC check and the BLER estimation. It is therefore possible to speed up the performance of the outer power control loop, since it is possible to get a first SIR reference value 406 before the first regulator 408 has completed its task. In this way the inner power control loop may start regulating earlier than the prior art methods. Though this first embodiment is well functioning, it is computationally complex and requires much hardware to estimate the ucBER, since it requires the same hardware as the transmitter to replicate its function on the data bits.

In a second embodiment of the present invention received pilot bits are used instead of the data bits to estimate the ucBER. A cascaded power control unit 500 as illustrated in FIG. 5 describes the power adjustment.

Figure 5:
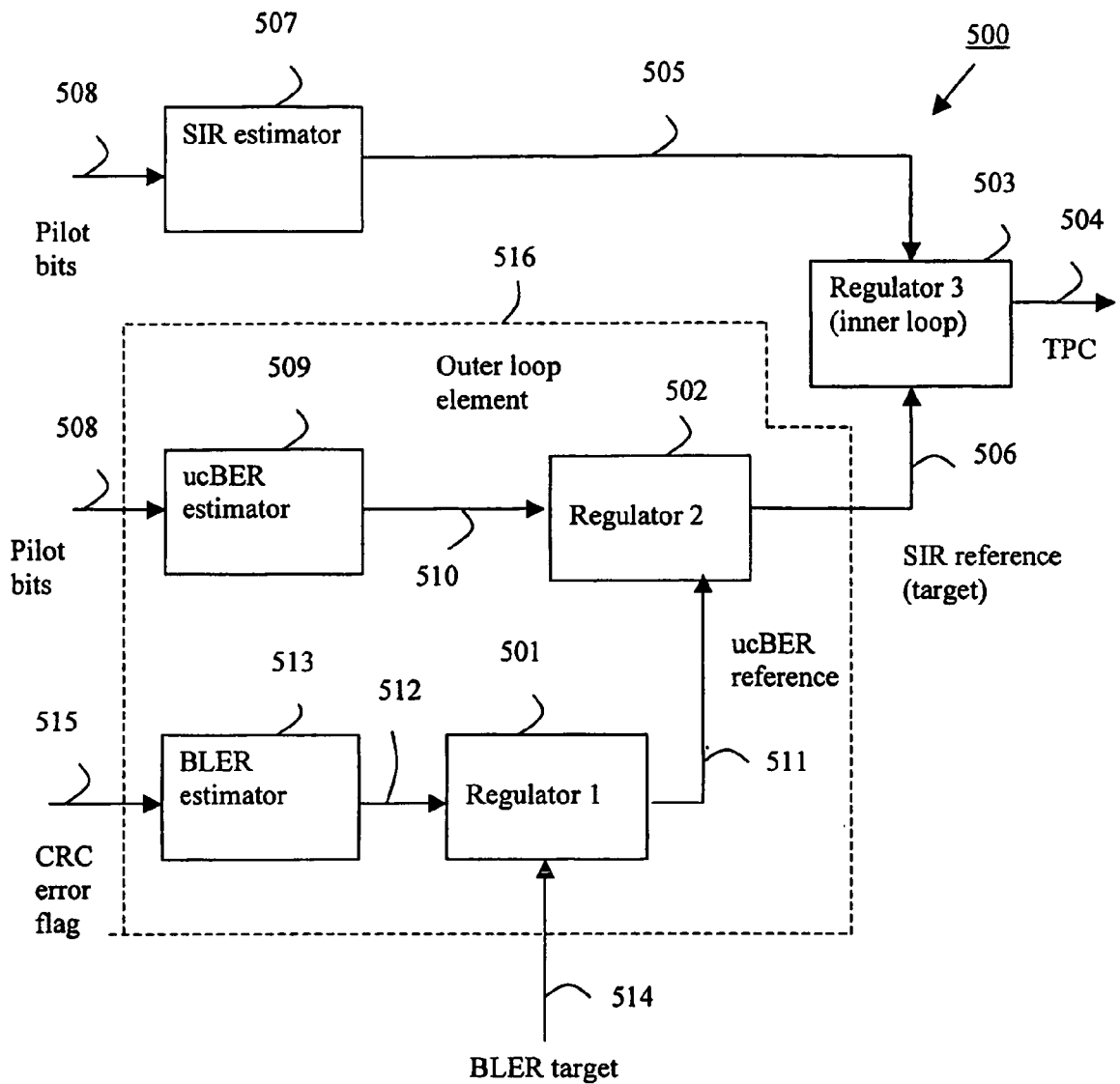
FIG. 5 is an illustration of a cascaded power control unit based on soft information and CRC according to a second embodiment of the present invention.

FIG. 5 illustrates a schematic block diagram for a power control unit 500 for uplink or downlink in a mobile communication system, where the power control unit 500 is using soft information and comprises three regulators in cascade. Each regulator may for example be a PI-regulator, although other well-known regulators may be used, such as PID regulators. Also different types of regulators may be used for each regulator in the power control unit 500. An outer power control loop element 516 comprises a first regulator 501 and a second regulator 502 and an inner power control loop comprises a third regulator 503 which produces a transmit power control (TPC) command 504 to be sent to a transmitter (not shown) with information how the transmitter should adjust its power. The third regulator 503 regulates an estimated quality measure 505, which may be an estimated signal-to-interference (SIR) value to meet a SIR reference value or target value 506, thereby forming the TPC command 504. If the estimated quality measure 505 is larger than the target value 506 the TPC command 504 contains information to the transmitter (not shown) to decrease its transmitted power level, and if the estimated quality measure 505 is above the target value 506, a TPC command 504 is sent to the transmitter to decrease its power level. A SIR estimator 507 estimates the estimated SIR value 505 on received bits 508, e.g. pilot bits. Preferably, this is performed every slot, which is 10/15 ms for WCDMA According to the second embodiment of the present invention, the received pilot bits 508 are also input to an ucBER estimator 509 which is of relatively low complexity. The ucBER estimator 509 may operate according to the method presented below and with reference also to FIG. 7. An estimated ucBER 510, which is the bit error rate (BER) before channel decoding in the receiver, is input to the second regulator 502, which regulates to meet a ucBER reference 511, thus producing the SIR reference value 506 to the third regulator 503. The ucBER estimator 509 performs its operation preferably on every block, which is for WCDMA every 30 slots. This means that it needs 30×10/15 ms=20 ms in operational time. By adding the ucBER estimator 509 and the second regulator 502 in the outer power control loop element 516, a quality measure for the wireless propagation channel is thus provided earlier than errors may be visible by the CRC check and the BLER estimation. It is therefore possible to speed up the performance of the outer power control loop, since it is possible to get a first SIR reference value 506 before the first regulator 501 has completed its task. In this way the inner power control loop may start regulating earlier than the prior art methods. The first regulator 501 regulates an estimated BLER value 512 from a BLER estimator 513 to meet a BLER target value 514, which is set by higher layers in the mobile communication system. The BLER estimation is based on a CRC error flag 515 for example by filtering the CRC error flag with appropriate filter constants. Alternatively, the BLER estimator 513 uses a moving average to get the estimated BLER value 512 from the CRC error flag 515.

The second embodiment of the present invention, further presents a method to estimate the ucBER by using pilot bits instead of data bits, thereby making the ucBER estimator 509 of low complexity. The SIR reference value 506 is set by an outer closed control loop element 516, which acts as a cascaded control system, and the SIR reference value 506 is used as target value for the inner closed power control loop 503. The outer power control loop measures the quality of the received signal, i.e. how the propagation channel has affected the transmitted signal by estimating the uncoded, or raw, BER (ucBER) on received pilot bits 508. The pilot bits are known and since the received pilot bits have experienced the same or similar propagation conditions in the wireless propagation channel, the ucBER is substantially proportional to the ucBER for the data bits. Although the pilot bits and the data bits may be sent with different power levels, their relative power difference is constant. This implies that the ucBER for the pilot bits follow the ucBER for the data bits when the bits are sent on the same wireless propagation channel. As well known in the art of regulation, a constant relative difference can always be compensated for by a closed control loop.

Figure 6:
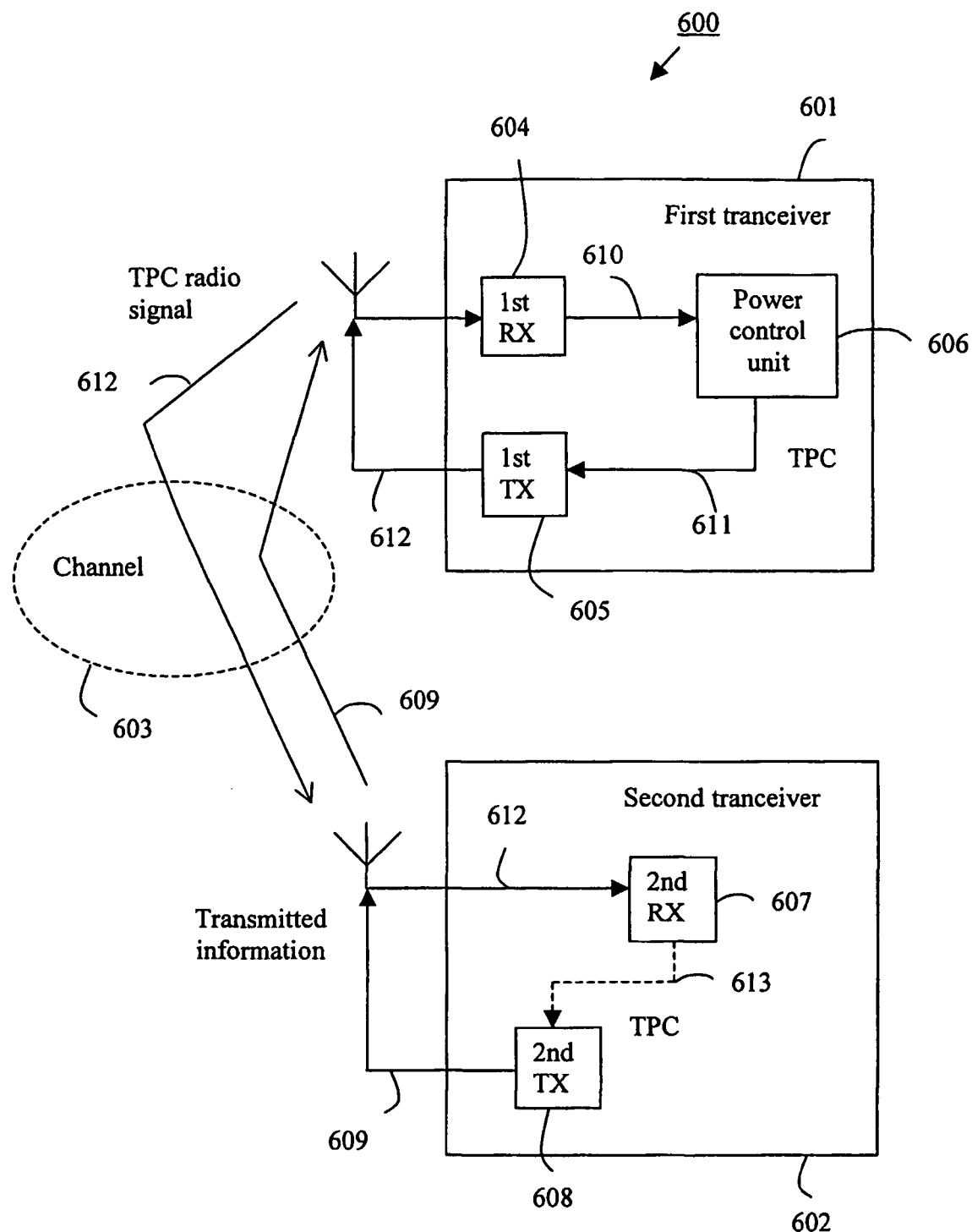
FIG. 6 is an illustration of a power control system according to the present invention.

In FIG. 6 illustrates a power control system 600 operating as a closed power control loop in none direction in a mobile communication system. The power control system 600 comprises at least a first transceiver 601 and a second transceiver 602. They communicate with each other over a wireless propagation channel 603 with radio signals carrying different kinds information. The first transceiver 601 comprises at least a first receiver 604, at least a first transmitter 605 and at least one power control unit 606, which for example may be any of the power control units 400; 500 described above in relation to FIG. 4 and FIG. 5. The second transceiver 602 comprises at least a second receiver 607 and at least a second transmitter 608. If the first transceiver 601 is a base station and/or an RCE in the mobile communication system, the power control system 600 is employed for the uplink propagation direction, and vice versa if the first transceiver 601 is a mobile unit in the mobile communication system, the power control system 600 is employed for the downlink propagation direction. However, the power control system may be employed in both the uplink and the downlink. In this case the second transceiver would also comprise a second power control unit. However, only in the purpose of simplifying the description of the power control system 600, the power control unit 606 is in FIG. 6 only located in the first transceiver 601. An information signal 609 is transmitted from the second transmitter 608 over the wireless propagation channel 603, which affects the signal in a random and unknown manner before received by the first receiver 604. The first receiver 604 processes the signal, by for example despreading, decoding and deinterleaving and forms a new received signal 610, which is input to the power control unit 606, which produces a transmit power control command (TPC) 611. The TPC command 611 is processed by the first transmitter 605 to form a radio signal 612 carrying the TPC information for transmission over the wireless propagation channel 603. The TPC radio signal 612 is received and processed by the second receiver 607 to form a reconstructed TPC command 613. The reconstructed TPC command 613 is input to control the power level of the second transmitter 608 since the TPC command 613 contains information how to adjust the power level of the transmitted signal 609 depending on the conditions of the wireless propagation channel 603.

Figure 7:
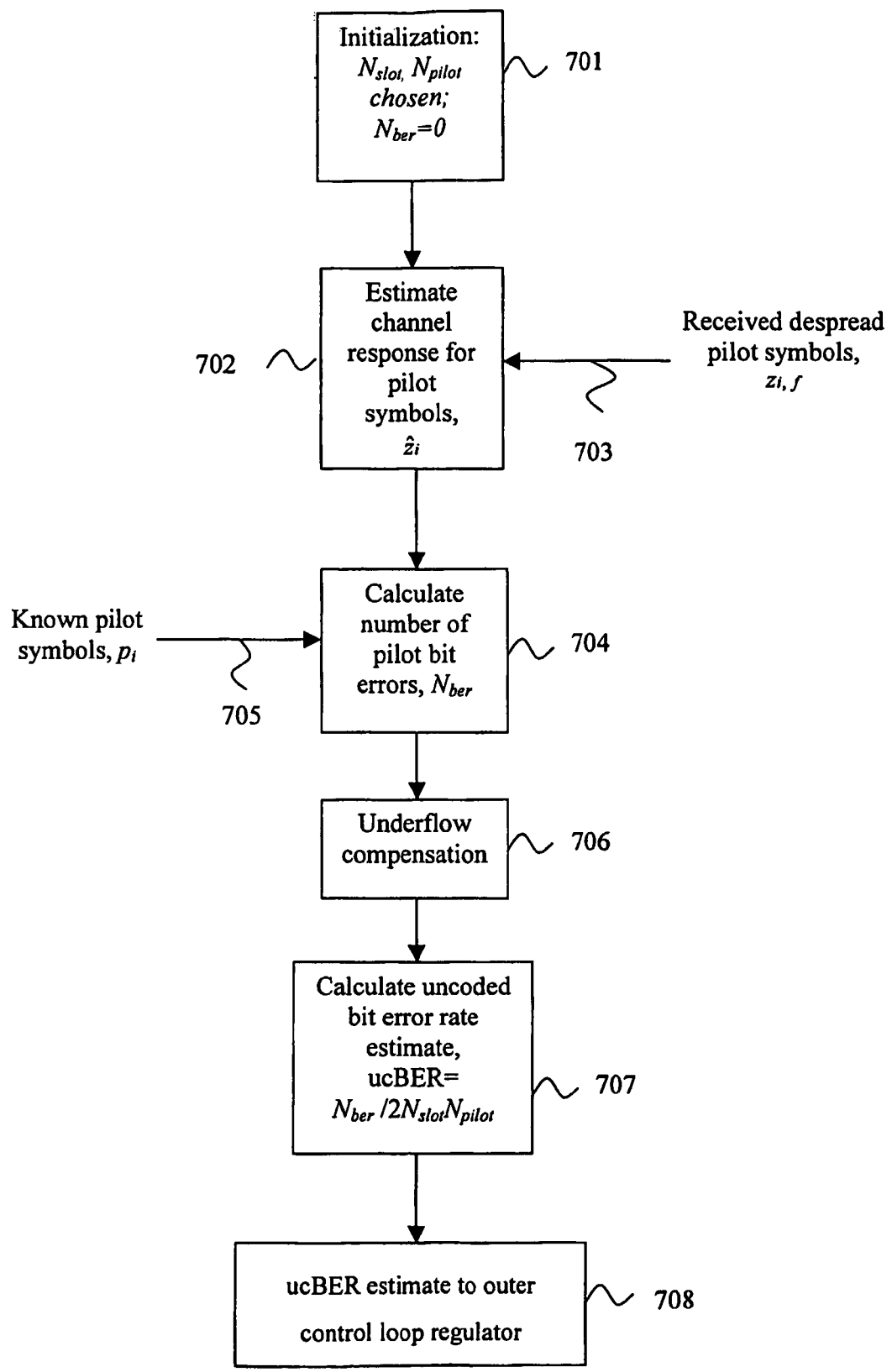
FIG. 7 is a flowchart illustrating a low-complexity method of estimating the ucBER according to the second embodiment of the present invention.

In the second embodiment of the present invention the ucBER estimator 509 may operate according to the following method, with reference to FIG. 7.

A receiver in a WCDMA system receives despreads symbols, $y_{i,f}$, from a Rake receiver, each symbol representing a number of bits, e.g. two bits. Here, i is the symbol index and f is the finger index of the Rake. In one WCDMA slot there are 2560/sf symbols (pairs of bits) or 2×2560/sf bits, where sf is the spreading factor. Then $$y_{i,f} = h_{i,f} x_i + \text{noise} \quad (1)$$

where $h_{i,f}$ is a true propagation channel response, which models the wireless propagation channel's influence on the signal, and $x_i$ represents the transmitted symbol representing complex transmitted bit information, i.e. $x_i = \pm 1 + i(\pm 1)$. The noise consists of interference from other base stations, quantization errors, and thermal noise. The receiver tries to estimate the channel response, $h_{i,f}$. The estimation is denoted $\hat{h}_{i,f}$.

Let $w_f$ be a real valued weight factor that is inversely proportional to an estimated noise power for finger f in the Rake receiver. Weighted channel estimates $w_f \hat{h}_{i,f}$ are formed to compensate for the noise. They are then used with the despread symbols, $y_{i,f}$, to estimate the transmitted symbol, $x_i$. Let the estimated transmitted symbol be denoted $\hat{x}_i$, then $$\hat{x}_i = \sum_{f=1}^{N_{fingers}} y_{i,f} (w_f \cdot \hat{h}_{i,f})^*, \quad (2)$$

where $N_{fingers}$ denotes the number of fingers used in the Rake receiver and $(.)^*$ is the complex conjugate of $(.)$. Substituting (1) into (2) and omitting the noise results in $$\hat{x}_i \approx \left( \sum_{f=1}^{N_{fingers}} h_{i,f} (w_f \cdot \hat{h}_{i,f})^* \right) x_i, \quad (3)$$

which shows that if the quantity in parenthesis is a positive, real number, $\hat{x}_i$ is proportional to $x_i$ and thus is an estimate of the transmitted symbol. This is true for good channel estimates, $\hat{h}_{i,f}$ and this means that the sent symbol has been recovered.

The uncoded bit error rate is defined as the bit error rate after hard decisions of the symbols $\hat{x}_i$ in (2). Hard decisions mean that sign information (sgn) of the real and imaginary parts of $\hat{x}_i$ is extracted and compared to the real and imaginary parts of $x_i$, respectively. Put algebraically, the rate of occurrences of $$Re\ x_{i=sgn}(Re\ \hat{x}_i)$$

$$Im\ x_{i=sgn}(Im\ \hat{x}_i) \quad (4)$$

is counted to get the ucBER.

Let there be $N_{ch\_est}$ channel estimates per slot. In a dedicated physical channel in WCDMA, the last symbols in a slot are the pilot symbols representing the pilot bits. As opposed to the data bits, which contain the actual information, the pilot bits are dummy bits, which are known by both the transmitter and the receiver. The idea according to the second embodiment A present invention behind estimating the uncoded bit error rate, is to replace despread data symbols $y_{i,f}$ in (2) by received despread dedicated pilot symbols, $z_{i,f}$. Since the pilots are the last symbols in the slot, the calculation uses the last weighted channel estimate, that is, $wf \cdot \hat{h}_{Nch\_est,f}$. Then the channel estimates based on the pilot symbols are defined as:

$$\hat{z}_i = \sum_{f=1}^{N_{fingers}} z_{i,f}(w_f \cdot \hat{h}_{Nch\_est}, f)^*, \quad (5)$$

for symbol i and where $z_{i,f}$ are the received despread pilot symbols. Since it is always known which pilot symbols, $p_i$, are sent, the number of bit errors may be counted. The pilot and data bits belong to the same physical channel and the wireless propagation channel will therefore influence them in a similar manner. Hence, preferably, the channel estimates used for the pilot symbols are derived in the same way as the channel estimates used for the data symbols. In one embodiment, the channel estimates are based on the common pilot channel (CPICH).

It is noted that, alternatively to using the last channel estimate in a slot, another channel estimate may be used, preferably another channel estimate for that slot.

Due to limited bit-widths of the pilot symbols, $\hat{z}_i$ may experience underflow, that is, it becomes zero and does not contain any information. This effect is compensated for according to the invention. In one embodiment, the $\hat{z}_i$ are represented as signed 4 bit integers.

The ucBER estimator 509 uses the received pilot bits in the received pilot symbols, $z_{i,f}$ 508 to estimate the ucBER 510. The flowchart in FIG. 7 shows a method according to the second embodiment of the present invention to estimate the ucBER, which comprises the following steps:

(i) Initialization 701 where a number of slots, $N_{slot}$ that will be used in computing an estimate for the bit error rate is chosen and a number of received pilot symbols, $N_{pilot}$ that will be used in each slot is chosen. Then a total of $2\ N_{slot}\ N_{pilot}$ bits will be used to estimate the bit error rate. Initially an accumulated number of bit errors, $N_{ber}$, is set to zero.

(ii) Estimation 702 in each slot of the received despread pilot symbols $z_{i,f}$ 703 according to equation (5).

(iii) In each slot, calculation 704 of the accumulated number of bit errors, $N_{ber}$, for the $N_{pilot}$ received pilot symbols. The sign information (sgn) of the real and imaginary parts of $\hat{z}_i$ is extracted and compared to the real and imaginary parts of the known pilot symbols, $p_i$ 705. Thus, the following calculations are performed:

$$N_{ber} = \begin{cases} N_{ber}, & Re\ p_i = sgn(Re\ \hat{z}_i) \quad \hat{z}_i \neq 0 \\ N_{ber} + 1, & Re\ p_i \neq sgn(Re\ \hat{z}_i) \quad \hat{z}_i \neq 0, \\ N_{ber} + 0.5, & \hat{z}_i = 0 \end{cases} \quad (6)$$

and $$N_{ber} = \begin{cases} N_{ber}, & Im\ p_i = sgn(Im\ \hat{z}_i), \quad \hat{z}_i \neq 0 \\ N_{ber} + 1, & Im\ p_i \neq sgn(Im\ \hat{z}_i), \quad \hat{z}_i \neq 0, \\ N_{ber} + 0.5, & \hat{z}_i = 0 \end{cases} \quad (7)$$

Here, $p_i$ is the known transmitted pilot symbol 705 and $\hat{z}_i$ is the estimated channel response for the received despread pilot symbols $\hat{z}_{i,f}$ 703.

Underflow compensation 706 is needed when $\hat{z}_i=0$. Then $N_{ber}+0.5$ is suitable for the accumulated bit error. To motivate this, assume that for the transmitted data symbol stream, $x_i$, the real and imaginary parts of the data symbols take on the values +1 or −1 with equal probability, i.e. P(Re $x_i=1$)=P(Im $x_i=1$)=P(Re $x_i=-1$)=P($x_i=-1$)=0.5, where P(.) denotes probability. This im the conditional probabilities:

$$P(Re\ x_i=1|\hat{x}_i=0)=P(Im\ x_i=1|\hat{x}_i=0$$

In other words, when $\hat{x}_i=0$, then half of the time Re $x_i=1$, which results in a bit error, and half of the time Re $x_i=-1$, which does not result in a bit error. In (iii) this is modeled by adding 0.5, half an error, to the accumulated number of bit errors, $N_{ber}$.

(iv) At the end of $N_{slot}$ slots, computation 707 of an estimated bit error rate is performed by $$ucBER = N_{ber}/{2N_{slot}N_{pilot}} \quad (8)$$

(v) Finally, the ucBER estimate is input to the outer loop regulator for producing a target value to the inner power control loop.

In an alternative embodiment for step (iii), in each slot, the calculation 704 of the accumulated number of bit errors, $N_{ber}$, for the $N_{pilot}$ received pilot symbols is performed according to:

$$N_{ber} = \begin{cases} N_{ber}, & Re\ p_i = sgn(Re\ \hat{z}_i), \quad Re\ \hat{z}_i \neq 0 \\ N_{ber} + 1, & Re\ p_i \neq sgn(Re\ \hat{z}_i), \quad Re\ \hat{z}_i \neq 0, \\ N_{ber} + 0.5, & Re\ \hat{z}_i = 0 \end{cases} \quad (6a)$$

and $$N_{ber} = \begin{cases} N_{ber}, & Im\ p_i = sgn(Im\ \hat{z}_i), \quad Im\ \hat{z}_i \neq 0 \\ N_{ber} + 1, & Im\ p_i \neq sgn(Im\ \hat{z}_i), \quad Im\ \hat{z}_i \neq 0, \\ N_{ber} + 0.5, & Im\ \hat{z}_i = 0 \end{cases} \quad (7a)$$

Hence, as in the above embodiment, the sign information (sgn) of the real and imaginary parts of $\hat{z}_i$ is extracted and compared to the real and imaginary parts of the known pilot symbols, $p_i$ 705. Here, $p_i$ is the known transmitted pilot symbol 705 and $\hat{z}_i$ is the estimated channel response for the received despread pilot symbols $z_{i,f}$ 703.

According to this embodiment, underflow compensation 706 is performed when Re $\hat{z}_i=0$ and/or Im $\hat{z}_i=0$. If any of these situations arises, $N_{ber}+0.5$ is added to the accumulated bit error.

It is noted that in the above embodiments, if the probabilities for +1 and −1 are different than 0.5, a different correction factor may be chosen. For example, assuming that the probability for +1 is p and the probability for −1 is (1−p)

and assuming that Re($x_i$) or Im($x_i$) being equal to zero is interpreted as +1, the correction factor is preferably chosen to be 1−p.

In yet another alternative embodiment for step (iii), underflow compensation is instead performed by letting the signs of the $N_{pilot}$ symbols be changed in each slot, such that there are as many bits equal to +1 as bits equal to −1. The signs of the corresponding real and imaginary parts of $\hat{z}_i$ then need be changed before checking for bit errors. The accumulated bit errors in step (iii) would then be updated as:

$$N_{ber} = \begin{cases} N_{ber}, & \text{Re } p_i = \text{sgn}(\text{Re } \hat{z}_i) \\ N_{ber} + 1, & \text{Re } p_i \neq \text{sgn}(\text{Re } \hat{z}_i) \end{cases} \quad (9)$$

and $$N_{ber} = \begin{cases} N_{ber}, & \text{Im } z_i = \text{sgn}(\text{Im } \hat{z}_i) \\ N_{ber} + 1, & \text{Im } z_i = \text{sgn}(\text{Im } \hat{z}_i) \end{cases} \quad (10)$$

In a preferred embodiment, the above change in sign is performed in addition to the underflow compensation according to step (iii), thereby ensuring that there are as many bits equal to +1 as bits equal to −1. Hence it is ensured that the probabilities are P(Re $p_i$=1)=P(Im $p_i$=1)=P(Re $p_i$=−1)=P(Im $p_i$=−1)=0.5, and the accuracy of the underflow compensation is improved.

According to yet another embodiment of the present invention a more complex approach would be to add a step of estimating a relative power difference, α, between the received pilot symbols and the received data symbols and then multiplying each of the estimated pilot symbols $\hat{z}_i$ by the relative power difference, a. This step would be performed before step (iii) or step (iv). The estimation of a may be performed by filtering the power of a restricted number of pilot and data symbols. Alternatively, the mobile communications network may provide the value of α.

Although preferred embodiments of the method and the system of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims. For example, while the embodiments of the invention have been described with respect to WCDMA, the invention is not limited thereto but may certainly be applicable to other mobile communication systems and combinations of different mobile communication systems.

The term "transceiver" used in this specification includes various kinds of mobile communication units present in a mobile communication system. Also the present invention is not limited to single-band or single-mode transceivers, but includes transceivers serving at least one mobile communication system.

The term "mobile unit" used in this specification includes various kinds of portable or mobile radio communication equipment, such as mobile telephones, pagers, electronic organizers, smart phones, communicators and other portable communication apparatus.

The invention claimed is:

1. A method of determining a target value for a control loop of a power control system in a mobile radio communications system, the method comprising:

receiving a communications signal via a communications channel, the communications signal representing a number of received data symbols and a number of received pilot symbols;

determining a number of estimated transmitted pilot symbols from the number of received pilot symbols and from a channel estimate of the communications channel;

calculating an accumulated pilot bit error from the number of estimated transmitted pilot symbols and from a set of reference pilot symbols, wherein the accumulated pilot bit error is compensated for an underflow in the estimated transmitted pilot symbols, if at least a first component of the estimated transmitted pilot symbol is equal to zero, and the compensation comprises the step of adding half an error to the accumulated pilot bit error; and determining the target value on the basis of the calculated pilot bit error.

2. The method according to claim 1, in which the first component of the first reference pilot symbol is one of the real and imaginary parts of the first reference pilot symbol, and wherein the first component of the first estimated transmitted pilot symbol is one of the real and imaginary parts of the first estimated transmitted pilot symbol.

3. The method according to claim 1, further comprising dividing the accumulated pilot bit error with the total number of bits to obtain an uncoded bit error rate.

4. The method according to claim 1, in which the control loop is an inner power control loop and the target value is determined by an outer control loop on the basis of the calculated pilot bit error and a target bit error rate.

5. The method according to claim 4, in which the outer power control loop and the inner power control loop are closed power control loops.

6. The method according to claim 1, in which the target value represents a signal-to-interference reference value.

7. The method according to claim 1, in which the method is employed on an uplink propagation direction in the mobile radio communications system.

8. The method according to claim 1, in which the method is employed on a downlink propagation direction in the mobile radio communications system.

9. The method according to claim 1, in which the reference pilot symbols represent reference pilot symbols of a WCDMA system.

10. The method according to claim 1, wherein each of the estimated transmitted pilot symbols is calculated from an estimated channel response of the corresponding reference pilot symbol.

11. A method of determining a target value for a control loop of a power control system in a mobile radio communications system, the method comprising:

receiving a communications signal via a communications channel, the communications signal representing a number of received data symbols and a number of received pilot symbols;

determining a number of estimated transmitted pilot symbols from the number of received pilot symbols and from a channel estimate of the communications channel;

calculating an accumulated pilot bit error from the number of estimated transmitted pilot symbols and from a set of reference pilot symbols, wherein the accumulated pilot bit error is compensated for an underflow in the estimated transmitted pilot symbols, wherein the step of calculating the accumulated pilot bit error further comprises:

incrementing the accumulated pilot bit error by a compensation factor, if a first component of a first one of the number of estimated transmitted pilot symbols is equal to zero; otherwise incrementing the accumulated pilot bit error based on a comparison of the first component of the first estimated transmitted pilot symbol with a corresponding first component of a corresponding first one of the set of reference pilot symbols, and determining the target value on the basis of the calculated pilot bit error.

12. The method according to claim 11, in which the first component of the first reference pilot symbol is one of the real and imaginary parts of the first reference pilot symbol, and wherein the first component of the first estimated transmitted pilot symbol is one of the real and imaginary parts of the first estimated transmitted pilot symbol.

13. A method of determining a target value for a control loop of a power control system in a mobile radio communications system, the method comprising:

receiving a communications signal via a communications channel, the communications signal representing a number of received data symbols and a number of received pilot symbols;

determining a number of estimated transmitted pilot symbols from the number of received pilot symbols and from a channel estimate of the communications channel;

calculating an accumulated pilot bit error from the number of estimated transmitted pilot symbols and from a set of reference pilot symbols, wherein the accumulated pilot bit error is compensated for an underflow in the estimated transmitted pilot symbols; wherein the step of calculating an accumulated pilot bit error is performed by hard decisions according to:

$$N_{ber} = \begin{cases} N_{ber}, & \text{Re } p_i = \text{sgn}(\text{Re } \hat{z}_i) \quad \text{Re } \hat{z}_i \neq 0 \\ N_{ber} + 1, & \text{Re } p_i \neq \text{sgn}(\text{Re } \hat{z}_i) \quad \text{Re } \hat{z}_i \neq 0 \\ N_{ber} + 0.5, & \text{Re } \hat{z}_i = 0 \end{cases}$$

and $$N_{ber} = \begin{cases} N_{ber}, & \text{Im } p_i = \text{sgn}(\text{Im } \hat{z}_i), \quad \text{Im } \hat{z}_i \neq 0 \\ N_{ber} + 1, & \text{Im } p_i \neq \text{sgn}(\text{Im } \hat{z}_i), \quad \text{Im } \hat{z}_i \neq 0 \\ N_{ber} + 0.5, & \text{Im } \hat{z}_i = 0, \end{cases}$$

where $N_{ber}$ is the accumulated pilot bit error, $p_i$ is a reference pilot symbol, $\hat{z}_i$ is the estimated transmitted pilot symbol, Re denotes the real part of a symbol, Im denotes the imaginary part of a symbol, and sgn is the sign operator, and determining the target value on the basis of the calculated pilot bit error.

14. A method of determining a target value for a control loop of a power control system in a mobile radio communications system, the method comprising:

initializing a power control system, which comprises choosing a total number of bits to be used in calculating the accumulated bit error, the total number of bits being $2 N_{slot} N_{pilot}$, where $N_{slot}$ is a number of slots to be used in calculating the accumulated bit error, and $N_{pilot}$ is a number of received pilot symbols to be used for every slot, receiving a communications signal via a communications channel, the communications signal representing a number of received data symbols and a number of received pilot symbols;

determining a number of estimated transmitted pilot symbols from the number of received pilot symbols and from a channel estimate of the communications channel;

calculating an accumulated pilot bit error from the number of estimated transmitted pilot symbols and from a set of reference pilot symbols, wherein the accumulated pilot bit error is compensated for an underflow in the estimated transmitted pilot symbols; and determining the target value on the basis of the calculated pilot bit error.

15. A method of determining a target value for a control loop of a power control system in a mobile radio communications system, the method comprising:

receiving a communications signal via a communications channel, the communications signal representing a number of received data symbols and a number of received pilot symbols;

determining a number of estimated transmitted pilot symbols from the number of received pilot symbols and from a channel estimate of the communications channel;

estimating a relative power difference, $\alpha$, between the received pilot bits and the received data bits and multiplying each of the estimated pilot symbols by the relative power difference, $\alpha$;

calculating an accumulated pilot bit error from the number of estimated transmitted pilot symbols and from a set of reference pilot symbols, wherein the accumulated pilot bit error is compensated for an underflow in the estimated transmitted pilot symbols; and determining the target value on the basis of the calculated pilot bit error.

* * * * *

UNITED STATES PATENT AND TRADEMARK OFFICE
CERTIFICATE OF CORRECTION

PATENT NO. : 7,366,230 B2
APPLICATION NO. : 10/499071
DATED : April 29, 2008
INVENTOR(S) : Jonsson It is certified that error appears in the above-identified patent and that said Letters Patent is hereby corrected as shown below:

In Column 7, Line 41, delete "none" and insert -- one --, therefor.

In Column 8, Line 31, delete "xi" and insert -- $x_i$ --, therefor.

In Column 9, Lines 5-7, in Equation (4), delete " $Re\ x_{i \neq sgn}(Re\ \hat{x}_i)$ " and " $Im\ x_{i \neq sgn}(Im\ \hat{x}_i)$ " and insert -- $Re\ x_i \neq sgn(Re\ \hat{x}_i)$ -- $Im\ x_i \neq sgn(Im\ \hat{x}_i)$ --, therefor.

In Column 9, Line 21, delete " $wf \cdot h_{Nch\_est,f}$ " and insert -- $wf \cdot \hat{h}_{Nch\_est,f}$ --, therefor.

In Column 10, Line 16, delete "$\hat{z}_{i,f}$" and insert -- $z_{i,f}$ --, therefor.

In Column 10, Line 17, delete "$\hat{z}_i=0$." and insert -- $\hat{z}_i=0$. --, therefor.

In Column 10, Line 21, delete "P($x_i$=-1)" and insert -- P(Im $x_i$=-1) --, therefor.

In Column 10, Line 22, delete "im" and insert -- implies that if $\hat{x}i = 0$ in (2), we have --, therefor.

In Column 10, Line 24, delete "$P(Im\ x_i=1|\hat{x}_i=0$" and insert -- $P(Im\ x_i = 1|\hat{x}i = 0) = 0.5$ --, therefor.

In Column 11, Line 17, in Equation (10), delete " $N_{ber} + 1,\ Im\ z_i = sgn(Im\ \hat{z}_i)$ " and insert -- $N_{ber} + 1,\ Im\ z_i \neq sgn(Im\ \hat{z}_i)$ --, therefor.

In Column 11, Line 33, delete "a." and insert -- α. --, therefor.

UNITED STATES PATENT AND TRADEMARK OFFICE
CERTIFICATE OF CORRECTION

PATENT NO. : 7,366,230 B2
APPLICATION NO. : 10/499071
DATED : April 29, 2008
INVENTOR(S) : Jonsson It is certified that error appears in the above-identified patent and that said Letters Patent is hereby corrected as shown below:

In Column 13, Lines 41-43, in Claim 13, delete "
$$\begin{cases} N_{ber}, & \text{Re } p_i = \text{sgn}(\text{Re } \hat{z}_i) \quad \text{Re } \hat{z}_i \neq 0 \\ N_{ber} + 1, & \text{Re } p_i \neq \text{sgn}(\text{Re } \hat{z}_i) \quad \text{Re } \hat{z}_i \neq 0 \\ N_{ber} + 0.5, & \text{Re } \hat{z}_i = 0 \end{cases}$$
" and insert --
$$\begin{cases} N_{ber}, & \text{Re } p_i = \text{sgn}(\text{Re } \hat{z}_i), \quad \text{Re } \hat{z}_i \neq 0 \\ N_{ber} + 1, & \text{Re } p_i \neq \text{sgn}(\text{Re } \hat{z}_i), \quad \text{Re } \hat{z}_i \neq 0 \\ N_{ber} + 0.5, & \text{Re } \hat{z}_i = 0 \end{cases}$$
--, therefor.

In Column 13, Line 52, in Claim 13, delete "$^{Nber}$" and insert -- $N_{ber}$ --, therefor.

In Column 13, Line 53, in Claim 13, delete " $\hat{z}i$ is" and insert -- $\hat{z}i$ is --, therefor.

Signed and Sealed this

Fourth Day of November, 2008

JON W. DUDAS
*Director of the United States Patent and Trademark Office*